US006060529A

United States Patent [19]

de Grave et al.

[11] Patent Number: 6,060,529
[45] Date of Patent: May 9, 2000

[54] SOUND-ABSORBENT FOAM MOLDINGS

[75] Inventors: Isidoor de Grave, Wachenheim; Hermann Tatzel, Weinheim, both of Germany

[73] Assignee: BASF Aktiengesellschaft, Ludwigshafen, Germany

[21] Appl. No.: 09/296,329

[22] Filed: Apr. 22, 1999

[30] Foreign Application Priority Data

Apr. 27, 1998 [DE] Germany ........................... 198 18 811

[51] Int. Cl.[7] ........................................................ C08J 9/18

[52] U.S. Cl. ........................... 521/60; 264/45.4; 521/142; 521/146

[58] Field of Search ............................. 521/60, 142, 146; 264/45.4

[56] References Cited

U.S. PATENT DOCUMENTS 4,014,770 3/1977 Suzuki et al. .......................... 521/50.5
4,111,862 9/1978 Geschwender ............................ 521/55

*Primary Examiner*—Morton Foelak
*Attorney, Agent, or Firm*—Oblon, Spivak, McClelland, Maier & Neustadt, P.C.

[57] ABSTRACT

The invention relates to sound-absorbent foam moldings which have a sound-absorption level according to DIN 52215 of from 30 to 95% in the frequency range from 0.5 to 4 kHz. The foam is an incompletely fused molded polyolefin or polystyrene foam with from 10 to 40% interstitial volume.

2 Claims, No Drawings

SOUND-ABSORBENT FOAM MOLDINGS

The invention relates to a sound-absorbent foam molding with a sound-absorption level of from 50 to 95% in the frequency range from 0.5 to 4 kHz.

Open-cell foamed plastics based on polyurethanes and on melamine-formaldehyde condensation resins are highly suitable as sound-absorbent materials and are increasingly used in many industrial applications. However, there are also certain disadvantages characteristic of these foams, for example where moisture is present, in the hygiene sector and in systems sensitive to dust.

It is an object of the present invention to provide a different foamed plastic with sound-absorbent properties.

We have found that this object is achieved by means of the incompletely fused molded polyolefin or polystyrene foams with from 10 to 40% interstitial volume and a sound-absorption level according to DIN 52215 of from 30 to 95%, preferably from 50 to 95%, in the frequency range from 0.5 to 4 kHz, preferably from 1.25 to 2 kHz.

For the purposes of the present invention, colyolefins are a) homopolypropylene, b) random copolymers of propylene with from 0.1 to 15% by weight, preferably from 0.5 to 12% by weight, of ethylene and/or a $C_4$–$C_{10}$-α-olefin, preferably a copolymer of propylene with from 0.5 to 6% by weight of ethylene or with from 0.5 to 15% by weight of 1-butene, or a terpolymer made from propylene, from 0.5 to 6% by weight of ethylene and from 0.5 to 6% by weight of 1-butene, or c) mixtures of a) or b) with from 0.1 to 75% by weight, preferably from 3 to 50% by weight, of a polyolefin elastomer, e.g. of an ethylene-propylene block copolymer with from 30 to 70% by weight of propylene d) polyethylene (LLDPE, LDPE, MDPE or HDPE) and e) mixtures of the polyolefins mentioned under a) to d) (after addition of compatibilizers, if desired).

The crystalline melting point (DSC maximum) of the polylefins listed under a) to e) is generally from 90 to 170° C. Their enthalpy of fusion, determined by DSC, is preferably from 20 to 300 J/g, and their melt index MFI according to DIN 53 735 is from 0.1 to 100 g/10 min (230° C., 2.16 kp for propylene polymers and 190° C., 2.16 kp for ethylene polymers).

In a preferred process for producing the EPO beads the starting material is polyolefin pellets, preferably with an average diameter of from 0.5 to 5 mm. 100 parts by weight of these pellets are dispersed in from 100 to 500 parts by weight of water with the aid of a suspending agent, in a stirred reactor. A blowing agent is then introduced under pressure, preferably in amounts of from 2 to 50 parts by weight, based on 100 parts by weight of polymer, and the reactor contents are heated. Suitable blowing agents are hydrocarbons, such as butane, halogenated hydrocarbons, alcohols, and also $CO_2$, $N_2$ and $NH_3$. The addition of the blowing agent here may take place prior to or during the heating of the reactor contents to the temperature for pressure release (including holding times). This temperature should be from 5° C. below to 20° C. above, preferably from 2 to 10° C. above, the crystalline melting point of the polyolefin. In the case of the preferred propylene polymers the operation is carried out at from 110° C. to 180° C. Depending on the amount and nature of the blowing agent, and also on the temperature, the pressure which becomes established in the reactor is generally higher than 2 bar and lower than 100 bar. The bulk density of the resultant EPO beads can be controlled via the choice of the impregnation temperature and of the blowing agent. After the temperature for pressure release has been reached, the pressure in the reactor is released, and the contents are usefully released into an intermediate container in which the pressure is preferably from 0.5 to 5 bar. When the pressure in the reactor is released the polyolefin pellets containing blowing agent expand to give EPO beads with an average diameter of from 1 to 20 mm.

The bulk density of the EPO beads can be adjusted over a broad range of between 10 and 100 g/l. EPO beads with relatively low bulk densities of from 15 to 40 g/l are particularly suitable. The EPO beads are predominantly closed-cell and have a cell number of from 1 to 5000 cells/$mm^2$, in particular from 10 to 1500 cells/$mm^2$.

These foam beads are then fused together with the aid of steam, in perforated molds in conventional molding machines. A significant factor is that, unlike in conventional molding, there is no, or at the most very small, counterpressure during the filling procedure. This gives the incomplete fusion of the invention. The proportion of voids, i.e. the interstitial volume, is from 10 to 40%, preferably from 20 to 38%. However, slight fusion, at least at points, is necessary to give a coherent molding.

In another production process the polyolefin is melted in an extruder and a volatile blowing agent, again preferably a hydrocarbon, is introduced under presure. The melt comprising blowing agent is then extruded into the atmosphere, where it foams. The resultant foam extrudate is then comminuted to give foam beads, which in the case of polyethylene are usefully subjected to electron-beam crosslinking. Relatively low bulk densities in the range from 10 to 20 g/l can be achieved by this method. In the case of polyethylene foam beads the intermediate product may also be manufactured on an air permeable conveyor belt which passes through a hot-air conduit.

Polystyrene foam beads are produced by a different process, which is also conventional and known per se. For this, the monomeric styrene, if desired in a mixture with other olefinically unsaturated comonomers, initiators, auxiliaries and additives, is suspended in water and polymerized in the presence of suspension stabilizers. The resultant polystyrene beads are isolated, washed and dried. The blowing agent here may be added as early as during the polymerization, but it is also possible to introduce the blowing agent into the polystyrene beads in a subsequent step. Suitable blowing agents are $C_4$–$C_8$-hydrocarbons, preferably pentane.

The polystyrene beads comprising blowing agent are usually likewise foamed by the processes known from the prior art, by, first of all, substantially completing their foaming with steam in open or closed prefoamers in a number of stages. The prefoamed polystryene beads generally have an average bead size of from 1 to 10 mm, in particular from 2 to 8 mm. The preferred bulk density is from 10 to 20 g/l. The moldings are produced in slabstock presses, and before this a material giving adhesion (e.g. bitumen) is applied to the surface of the foam beads. In the slabstock press the foam beads are fused, with light counterpressure, to give a loosely bonded material.

A great advantage of the sound-absorbent foam moldings based on polyolefins and polystyrene is that these thermoplastics can be melted and therefore can be recycled.

EXAMPLE 1

To produce acoustic boards of dimensions 900×400×140 mm, a conventional molding machine was used to transport PP foam beads with an average bulk density of 28 g/l (Neopolen P 9230 BASF AG) pneumatically from a container in which the pressure was 0.5 bar into a perforated mold cavity in which atmospheric pressure prevailed. With the shut-off valves in the condensate line open, superheated steam at 2.8 bar was applied laterally, in each case for 3 sec, to the two sides of the foam beads in the form of loose material in the mold cavity, resulting in point-fusion of the material. After cooling in the mold cavity and opening of the molding machine, a block-shaped molding with a density of 33 $kg/m^3$ was removed and had a relatively high number of interstices (void areas between the point-fused foam beads). The proportion of interstices was 35%. The sound-absorption level according to DIN 52215 was from 75 to 90% in the frequency range from 1.25 to 2 kHz.

EXAMPLE 2

The method was based on that of Example 1, but a difference in pressure between the filler container and the mold cavity was used for the filling of the mold cavity in which atmospheric pressure prevailed, and the lateral steam treatment took place at 3.2 bar and with a steam-treatment time of 4 sec.

The proportion of interstices in the resultant block-shaped molding was 25%. The sound-absorption level was from 55 to 70% in the frequency range from 1.25 to 2 kHz.

EXAMPLE 3

PP foam beads with an average bulk density of 17 g/l (Neopolen P 9220) were used to produce acoustic boards of dimensions 300×200×60 mm on a conventional molding machine. The foam beads were transported pneumatically into a perforated mold cavity in which atmospheric pressure prevailed. With the shut-off valves in the condensate line opened, superheated steam at 2.4 bar was applied laterally, in each case for 3 sec, to the two sides of the foam beads in the form of loose material in the mold cavity, resulting in point-fusion of the material. After cooling in the mold cavity and opening of the molding machine, a block-shaped molding with a density of 24 $kg/m^3$ was removed. The proportion of interstices in the interior of the molding was 30%. The sound-absorption level was 80% in the frequency range from 1.25 to 2 kHz.

EXAMPLE 4

PE foam beads (Neopolen E 1710 from BASF AG) with a bulk density of 13 g/l, which had previously been physically crosslinked by electron-beam irradiation, were gravity-fed to a height of about 200 mm onto a circulating conveyor belt permeable to air (belt width 1100 mm) and transported through a hot-air conduit. The transport rate was 1.6 m/min and the air circulating in the heating conduit was at 160° C. After leaving the conduit, 6 m in length, the foam beads had been point-fused to give a coherent bonded material which had about 40% of voids. The sound-absorption level in the frequency range from 1.25 to 2 kHz of this molding (density: 14 $kg/m^3$) was from 85 to 90%.

We claim:

1. A sound-absorbent foam molding with a sound-absorption level according to DIN 52215 of from 30 to 95% in the frequency range from 0.4 to 4 kHz, wherein the foam is an incompletely fused molded polyolefin or polystyrene foam beads with from 10 to 40% interstitial volume.

2. A sound-absorbent foam molding according to claim 1, wherein the foam is a molded polyethylene or polypropylene foam beads.

* * * * *